United States Patent
Kido et al.

(10) Patent No.: US 9,030,570 B2
(45) Date of Patent: May 12, 2015

(54) PARALLEL OPERATION HISTOGRAMMING DEVICE AND MICROCOMPUTER

(75) Inventors: Hideaki Kido, Chiyoda-ku (JP);
Akihiro Yamamoto, Kawasaki (JP);
Hiroyuki Hamasaki, Kawasaki (JP);
Nobuyasu Kanakawa, Chiyoda-ku (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 469 days.

(21) Appl. No.: 13/529,642

(22) Filed: Jun. 21, 2012

(65) Prior Publication Data
US 2012/0327260 A1 Dec. 27, 2012

(30) Foreign Application Priority Data
Jun. 27, 2011 (JP) .................. 2011-141507

(51) Int. Cl.
*G06T 1/20* (2006.01)
*G06K 9/38* (2006.01)

(52) U.S. Cl.
CPC .... *G06T 1/20* (2013.01); *G06K 9/38* (2013.01)

(58) Field of Classification Search
CPC .............. G06T 5/40; G06T 7/403; G06T 1/20;
G06K 9/38; G06K 9/4642; G06K 9/4647;
G06K 2017/0077; H04N 1/4074; G06F 15/70
USPC .......... 348/207.99, 222.1, 672; 382/168–172;
358/522; 702/180; 326/39; 365/230.1;
345/89; 718/100
See application file for complete search history.

(56) References Cited

U.S. PATENT DOCUMENTS

| | | | | | |
|---|---|---|---|---|---|
| 6,028,807 | A | * | 2/2000 | Awsienko | ................. 365/230.02 |
| 2002/0145581 | A1 | * | 10/2002 | Kudo et al. | ...................... 345/89 |
| 2003/0151671 | A1 | * | 8/2003 | Kubota et al. | ............ 348/207.99 |

(Continued)

FOREIGN PATENT DOCUMENTS

| | | | | |
|---|---|---|---|---|
| JP | S61-153771 | A | | 7/1986 |
| JP | 63098078 | A | * | 4/1988 .............. G06F 15/70 |
| JP | S63-98078 | A | | 4/1988 |
| JP | H01-166174 | A | | 6/1989 |
| JP | H10-105702 | A | | 4/1998 |
| JP | 2002-109535 | A | | 4/2002 |

OTHER PUBLICATIONS

Histogram calculation in CUDA, Nov. 2007, NVIDIA, searched by internet on May 19, 2011, downloaded from <URL:HTTP: compute cuda 1__1 Website projects histogram256 doc histogram.pdf developer.download.nvidia.com>.

*Primary Examiner* — Dennis Hogue
(74) *Attorney, Agent, or Firm* — Womble Carlyle

(57) ABSTRACT

A parallel operation histogramming device can handle parallel-input data from a plurality of processors to generate frequency data of a histogram. The processing time for generating frequency data of the histogram is independent of the distribution of histogram values in the input data. The device can also reduce the memory area used for accumulating frequency data of the histogram. The device includes a histogram counter circuit which has a plurality of counters equal in number to the number of histogram bins. The counters count in parallel the number of pieces of data for each type of the operation results from the plurality of processors. The counted values from each counter are accumulated to form the frequencies in a histogram.

18 Claims, 11 Drawing Sheets

(56) References Cited

U.S. PATENT DOCUMENTS

| | | |
|---|---|---|
| 2008/0158430 A1* | 7/2008 | Hu .............................. 348/672 |
| 2008/0276236 A1* | 11/2008 | Branover et al. ............ 718/100 |
| 2008/0312874 A1* | 12/2008 | Gudivada et al. ............ 702/180 |
| 2009/0128187 A1* | 5/2009 | Barford .......................... 326/39 |
| 2010/0092084 A1* | 4/2010 | Perronnin et al. ............ 382/170 |
| 2013/0329076 A1* | 12/2013 | Shaw ........................ 348/222.1 |

\* cited by examiner

PARALLEL OPERATION HISTOGRAMMING DEVICE AND MICROCOMPUTER

CROSS-REFERENCE TO RELATED APPLICATION

The disclosure of Japanese Patent Application No. 2011-141507 filed on Jun. 27, 2011 including the specification, drawings and abstract is incorporated herein by reference in its entirety.

BACKGROUND

The invention relates to a parallel operation device and a microcomputer used for calculation of a histogram, and relates to technology which can be effectively applied to a microcomputer such as, for example, an image processor, a digital signal processor, and an audio processor.

In data processing which handles a large amount of data such as image processing or audio processing, a plurality of processors is in many cases operated in parallel to improve the efficiency of data processing. However, there have been some types of data processing that cannot sufficiently take advantage of the parallelism of processors, for example, calculation for generating a histogram. A histogram indicates the frequency distribution (frequencies of appearance) of data and is used very often in image data processing, for example, which begins with acquiring a histogram of the entire image and uses the histogram to describe local features of an image.

As a technique for high speed calculation of a histogram, Patent Document 1 (Japanese Patent Laid-Open No. 1986-153771) describes an apparatus which acquires a histogram from data input in a single system. Patent Document 2 (Japanese Patent Laid-Open No. 1989-166174) also describes an apparatus which acquires a histogram from data input in a single system as with Patent Document 1.

Patent Document 3 (Japanese Patent Laid-Open No. 2002-109535) discloses a circuit which calculates a histogram that does not easily depend on the number of pixels of input image data by allowing a larger numerical expression with a memory means having a small word length.

Patent Document 4 (Japanese Patent Laid-Open No. 1998-105702) describes a histogram acquisition apparatus which omits the points where the accumulation value of the histogram is zero. According to the document, the memory area for storing histogram values with zero histogram frequency becomes needless, and thus the number of memory areas (also simply referred to as bins) for storing histogram values can be reduced, which in turn contributes to mitigation of transfer process or shortening of transfer time of frequency data in a gradation frequency memory forming a plurality of bins.

According to Japanese Patent Laid-Open No. 1988-98078 (Patent Document 5), each processor is provided with sub-histograms having the same capacity as a histogram desired to be finally acquired, and sub-histograms are calculated for each processor. After the calculation, the sub-histograms are added for each bin to acquire the desired histogram.

Non-Patent Document 1 ("Histogram calculation in CUDA, URL:http://developer.download.nvidia.com/compute/cuda/1_1/Website/projects/histogram256/doc/histogram.pdf.") illustrates a configuration of generating a histogram by a multiprocessor system allowing a plurality of processors to access bins in the same histogram. In this case, updating of bins by the processor is processed in an ordered manner.

The inventors have considered calculating histograms with high speed by inputting and processing in parallel data which has been processed in parallel by a plurality of processors.

However, none of patent documents 1 to 4 can handle the process of generating a histogram for parallel-input data.

In the case of Patent Document 5, although it can perform the process of generating a histogram for parallel-input data, a memory area for sub-histograms must be prepared for each processor. Letting N be the number of processors and M the number of the bins, and assuming that each bin requires 32 bits to store the maximum frequency of occurrences, a memory capacity of N×M×32 bits is required in the memory area for sub-histograms. In addition, data of sub-histograms accumulated in the memory area for each sub-histogram must be added, and thus the addition process may cause the total processing time to increase.

In the case of Non-Patent Document 1, the processing time differs for patterns of input data. For example, when acquiring a histogram of brightness values of an image, the worst case of processing time is where the brightness values of the image are all the same. Assuming that each processor can update the frequency of the histogram for one bin in a single clock, with the number of processors in this occasion being N, each processor must necessarily wait for N clocks until its turn of performing the update process of the bin comes around, which takes a long processing time.

The present invention has been made in view of the above circumstances and provides a parallel operation device and a microcomputer which can handle parallel-input data to generate frequency data of a histogram, with the processing time for generating frequency data of the histogram not depending on the distribution of histogram values in its input data, and can further reduce the memory area used for accumulating frequency data of the histogram.

The other purposes and the new feature of the present invention will become clear from the description of the present specification and the accompanying drawings.

SUMMARY

The following explains briefly the outline of a typical invention disclosed in the present application.

In other words, for parallel operation results by a plurality of processors, a histogram counter circuit which has a plurality of counters which counts the number of pieces of data for each type of the operation results in parallel, and accumulates the counted values of respective counters as frequencies in a histogram, is provided.

Parallel input of operation results can be handled by providing the counters described above. Accordingly, the memory area required to accumulate the counted values of the counters in the histogram counter circuit can be made smaller than the memory area conventionally required when forming sub-histograms, and furthermore, processing of parallel operation results can proceed in parallel as far as updating frequencies of the histogram. Therefore, the process of forming a histogram can be completed within a constant time regardless of distribution of the data to be processed, in contrast with the serial processing in which a plurality of processors updates the frequencies of the histogram in a predetermined order.

The following explains briefly the effect of the typical invention disclosed in the present application.

Frequency data of a histogram can be generated by handling parallel-input data, with the processing time for generating frequency data of the histogram not depending on (i.e., independent of) the distribution of histogram values in its input data, and further, the memory area used for accumulating frequency data of the histogram can be reduced by more than a method using sub-histograms.

DETAILED DESCRIPTION

1. Outline of Embodiments

Figure 1:
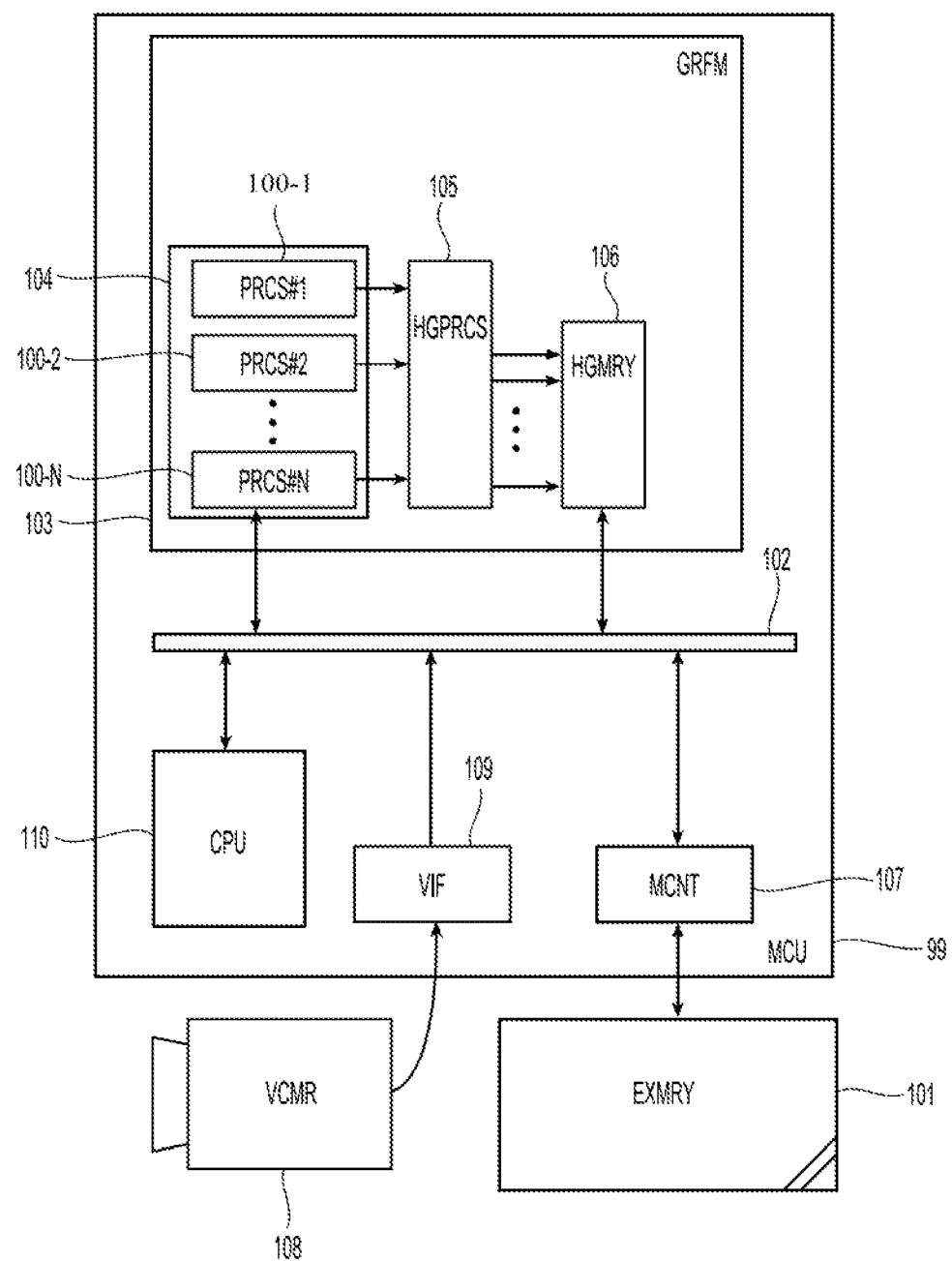
FIG. 1 is a block diagram illustrating a microcomputer according to an embodiment of the invention.

First, the following explains briefly the outline of a typical embodiment disclosed in the present application. Reference numerals of the drawings referred to in the outline explanation of representative embodiments in a parenthesized manner are only illustrative of what are included in the concept of the components to which they are provided.

[1] <Generating Number of Pieces of Data for Each of M Types of Histogram Values from N Parallel Operation Results>

A parallel operation device (103) according to a representative embodiment of the invention has N processors (100-1 to 100-N) capable of parallel operation, M counters (303-1 to 303-M) which count and output the number of pieces of data for each of M types of histogram values to which the respective operation results belong, and a histogram counter circuit (304, 106) which accumulates and stores the output of each of the M counters.

Accordingly, parallel input of operation results by each of N processors can be handled by providing the counters described above. Therefore, the memory area in the histogram counter circuit required to accumulate the counted values of the counters in the histogram counter circuit can be made smaller than the memory area conventionally required when forming sub-histograms. Furthermore, processing of parallel operation results can proceed in parallel as far as updating frequencies of the histogram, and thus the process of forming a histogram can be completed within a constant time regardless of distribution of the data to be processed, in contrast with the serial processing in which a plurality of processors updates the frequencies of the histogram in a predetermined order.

[2] <Generating Number of Pieces of Data for Each of M Types of Histogram Values from N Parallel Operation Results>

A parallel operation device (103) according to a further specific embodiment of the invention has N processors (100-1 to 100-N) capable of parallel operation, and N signal generation circuits (302-1 to 302-N) each of which generates, for a corresponding one of the N processors, M types of classification signals for each parallel operation indicating to which of the M types of histogram values the respective operation results belong. The parallel operation device (103) also has M counters and histogram counter circuits (304, 106). The M counters (303-1 to 303-M) receive the classification signals as inputs from the output of the N signal generation circuits. Each of the M counters counts the number of classification signals of a single type. Collectively, the M counters keep track of the number of each of M types of histogram data resulting from every parallel operation by the N processors. The histogram counter circuit (304, 106) accumulates and stores an output of each of the M counters.

Accordingly, an effect similar to that of item 1 is exerted. Furthermore, each of the N signal generation circuits generates M types of classification signals for corresponding operation results and distributes the signals to each of the M counters, and thus it becomes possible to easily perform the counting process of the number of pieces of data for each histogram value in parallel by the M counters.

[3] <Signal Generation Circuit>

In the parallel operation device of item 2, the signal generation circuit (302-1 to 302-N) generates, for an operation result of a corresponding processor, M types of classification signals corresponding to histogram values, assigns logical value 1 to a classification signal of a histogram value corresponding to an input operation result and logical value 0 to a classification signal of a histogram value not corresponding to the input operation result, and outputs the classification signals.

Accordingly, a signal generation circuit suitable for the counter which counts the number of pieces of data can be implemented.

[4] <Histogram Counter Circuit>

In the parallel operation device of item 2, the histogram counter circuit has adder circuits (304-1 to 304-M) and registers (305-1 to 305-M) provided to each of the M counters. The adder circuit adds an output of a corresponding counter and a register value held in a corresponding register, and the register receives and stores an output of a corresponding adder circuit as an updated register value.

Accordingly, a configuration for accumulating the number of pieces of data in the histogram counter circuit can be easily implemented by using registers. The number of pieces of data is counted by the M counters in each parallel operation with the N processors.

[5] <Generation of a Histogram for Gradients and Number of Pixels in Image Data>

In the parallel operation device of item 2, the M types of histogram values are gradients which pixels can exhibit.

Accordingly, the parallel operation device can be applied to image processing using a histogram for gradients of image data.

[6] <Microcomputer>

A microcomputer (99) according to another embodiment of the invention has the parallel operation device of item 2 and a central processing unit (110) which controls the parallel operation device.

Accordingly, the histogram calculation function in a microcomputer can be enhanced.

[7] <1-chip Microcomputer>

The microcomputer of item 6 is formed on a single semiconductor substrate.

Accordingly, the histogram calculation function can be integrated in a single chip.

[8] <Accumulating, in Memory, Number of Pieces of Data for Each of M Types of Histogram Values from N Parallel Operation Results>

A parallel operation device (103A) according to yet another embodiment of the invention has N processors (100-1 to 100-N) capable of parallel operation; M counters (706-1 to 706-M) divided into J groups with each group having K counters, the M counters configured to count, for each parallel operation by the N processors and for each histogram value, the number of pieces of data for each of M types of histogram values to which the respective operation results belong, and accumulate the counted values once in every K times of the parallel operation, with accumulation timings shifted to each other; and J memory units (701,702) each provided with K memory areas (701-1 to 701-K, 702-1 to 702-K) which accumulate and store, for each counter, output of the counter which has been selected one by one sequentially from each of J groups in which the M counters are divided into units of K. It will be understood here that J and K also are integers.

Accordingly, parallel input of the operation results by each of the N processors can be handled by providing the counters described above. Therefore, the memory area of the memory unit required to accumulate the counted value of the counters can be made smaller than the memory area conventionally required when forming sub-histograms. Particularly, the number of pieces of data for each of M types of histogram values can be accumulated in J memory units each having K memory areas. Furthermore, processing of parallel operation results can proceed in parallel as far as updating frequencies of the histogram, whereby the process of forming a histogram can be completed within a constant time regardless of distribution of the data to be processed, in contrast with the serial processing in which a plurality of processors updates the frequencies of the histogram in a predetermined order.

[9] <Accumulating, in Memory Units, Number of Pieces of Data for Each of M Types of Histogram Values from N Parallel Operation Results>

A parallel operation device (103A) according to yet another embodiment of the invention has N processors (100-1 to 100-N) capable of parallel operation; N signal generation circuits (302-1 to 302-N) each of which generates for a corresponding one of the N processors, M types of classification signals for indicating which of the M types of histogram values the respective operation results belong to; and M counters (706-1 to 706-M) divided into J groups with each group having K counters, the M counters configured to receive as input and count, the number of classification signals of each type output from the N signal generation circuits, and accumulate the counted values once in every K times of the parallel operation, with accumulation timings shifted to each other. The parallel operation device further has a counter selector (703, 704) which selects the output of the counter one by one sequentially from each of the J groups having K counters into which the M counters are divided. The parallel operation device further has J memory units (701,702) each provided with K memory areas (701-1 to 701-K, 702-1 to 702-K) which accumulate and store output of the counter selected by the counter selector for each counter, the memory area being selected in synchronization with selecting an output of the counter.

Accordingly, an effect similar to that of item 8 is exerted. Furthermore, each of the N signal generation circuits generates M types of classification signals for corresponding operation results and distributes the signals to each of the M counters, and thus it becomes possible to easily perform the counting process of the number of pieces of data for each histogram value in parallel by the M counters.

[10] <Signal Generation Circuit>

In the parallel operation device of item 9, the signal generation circuit generates and outputs, for the operation result of a corresponding processor, M types of classification signals corresponding to histogram values, with a classification signal of a histogram value corresponding to the input operation result set to logical value 1 and a classification signal of a histogram value not corresponding to the input operation result set to logical value 0.

Accordingly, a signal generation circuit suitable for the counter which counts the number of pieces of data can be implemented.

[11] <Counter>

In the parallel operation device of item 10, the counter has a bit counter (804) which receives as input and counts one type of corresponding classification signal from N signal generation circuits, an adder circuit (805), and an accumulation buffer (806). The counter adds, using the adder circuit (805), the output of the bit counter (804) and an accumulation value held in the accumulation buffer (806) once in every K times of the parallel operation, and outputs the result of addition in the accumulation buffer (806) as an updated accumulation value.

Accordingly, it becomes possible to easily allow for adequate write waiting time for sequentially writing the number of pieces of data for each histogram value into K memory areas of the memory.

[12] <Counter>

In the parallel operation device of item 10, each counter (706-m) has a number N*K input buffers (904-1-1 to 904-1-K, ..., 904-N-1 to 904-N-K) which receive as input and hold one type of corresponding classification signal from N signal generation circuits once in every K times of the parallel operation, and a bit counter (907) which counts and outputs, once in every K times of the parallel operation, the classification signals held by the input buffer.

Accordingly, a configuration which allows for adequate write waiting time for sequentially writing the number of pieces of data for each histogram value into K memory areas of the memory can be easily implemented.

[13] <Generation of a Histogram for Gradients and Number of Pixels in Image Data>

In the parallel operation device of item 9, the M types of histogram values are gradients which pixels can exhibit.

Accordingly, the parallel operation device can be applied to image processing using a histogram for gradients of image data.

[14] <Microcomputer>

A microcomputer according to yet another embodiment of the invention has the parallel operation device according to item 9 and a central processing unit (110) which controls the parallel operation device.

Accordingly, the histogram calculation function in a microcomputer can be enhanced.

[15] <1-chip Microcomputer>

The microcomputer of item 14 is formed on a single semiconductor substrate.

Accordingly, the histogram calculation function can be integrated in a single chip.

2. Details of Embodiments

Embodiments will be described in more detail below.

<<Embodiment 1>>

FIG. 1 illustrates a microcomputer according to an embodiment of the invention. A microcomputer (MCU) 99 is formed on a single semiconductor substrate such as single crystalline silicon, although not particularly limited thereto, by CMOS integrated circuit fabrication technology. The microcomputer may include multiple chips without being limited to a single chip.

The microcomputer 99 includes the image processing module (GRFM) 103 as an exemplary parallel operation device, and the image processing module 103 is connected to an internal bus 102 together with the central processing unit (CPU) 110, a video interface circuit (VIF) 109, a memory controller (MCNT) 107, or the like. The memory controller 107 has an external memory (EXMRY) 101 connected thereto, and the image processing module 103 reads image data stored in the external memory 101 and performs image processing, the result of which is written into the external memory 101. The CPU 110 executes a program stored in a program memory (not shown) to conduct overall control of the microcomputer 99.

The video interface 109 has, for example, a video camera 108 connected thereto, and the video interface 109 may expand the video data captured by the video camera 108 to the external memory 101.

The image processing module 103 has a group of processors 104 having a number N (N is a positive integer) processors (PRCS#1 to PRCS#N) 100-1 to 100-N capable of parallel operation in each operation cycle. The group of processors 104 read image data from the external memory 101, and the data is then separated into small data regions, for example at each position of display frames or at every several display lines (separate at each position or every several image lines of the image when a display frame is an "image"). The small data regions are distributed among the N processors 100-1 to 100-N and processed in parallel. It is particularly assumed that a configuration for a case where data of a histogram (frequency distribution) for the image data is acquired using the operation result of parallel processing is mainly described here.

The image processing module 103 has a histogram memory (HGMRY) 106 which stores data of a histogram for image data. Assuming that the histogram memory 106 can accommodate up to a maximum of 65536 ($2^{16}$) counts (sometimes called "frequencies" or "occurrences") for each gradation value (histogram value), in order to form a histogram of gray values of an image with 256 gradation values, for example, it is conceivable to use a memory having a memory capacity equivalent to a total of 256 bins with a size of 16 bits per bin, 16 bits being the memory area needed for storing a single histogram count value.

Figure 2:
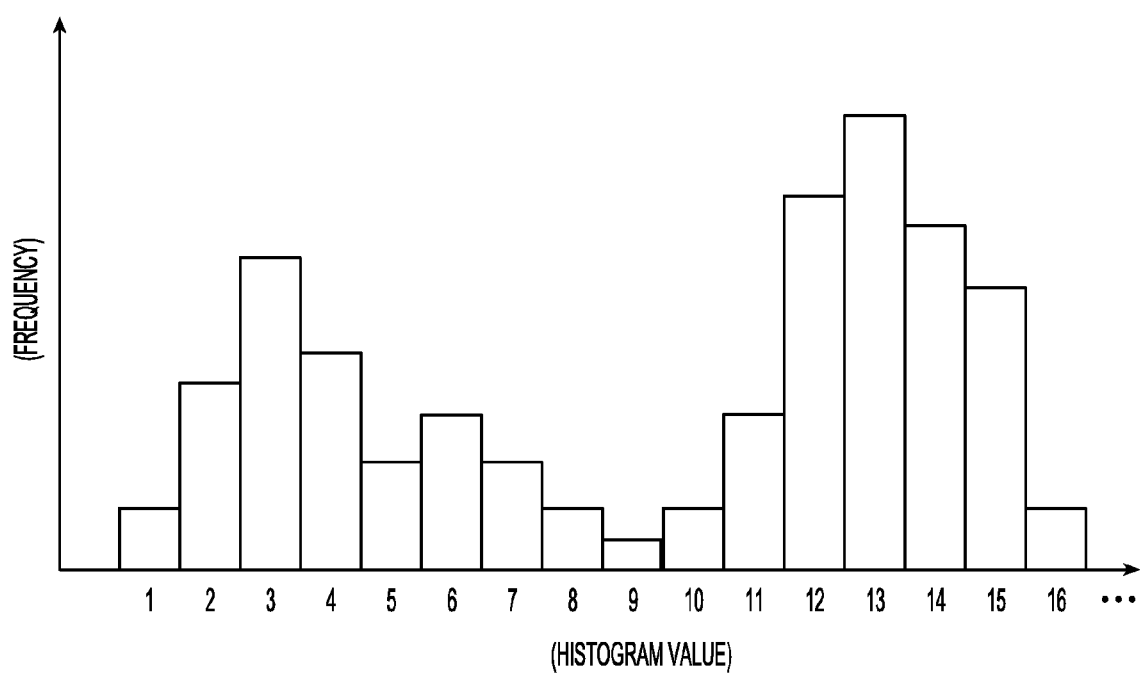
FIG. 2 is an explanatory diagram illustrating a histogram with the horizontal axis indicating histogram values and the vertical axis indicating frequencies.

The input image data is processed by respective processors 100-1 to 100-N of the group of processors 104 in parallel, the result of which is sent to a histogram processing circuit (HGPRCS) 105 in parallel, and the output from the processing in the histogram processing circuit 105 is stored in the corresponding bin of the histogram memory 106 so that the histogram data such as that shown in FIG. 2, for example, is accumulated. The horizontal axis in FIG. 2 indicates histogram values and the vertical axis indicates the number of counts. The histogram data accumulated in the histogram memory 106 is transferred to the external memory 101 by access control of the CPU 110 or a DMAC (not shown). The histogram data stored in the external memory 101 is provided to yet another processing by the CPU 110 or the like.

Figure 3:
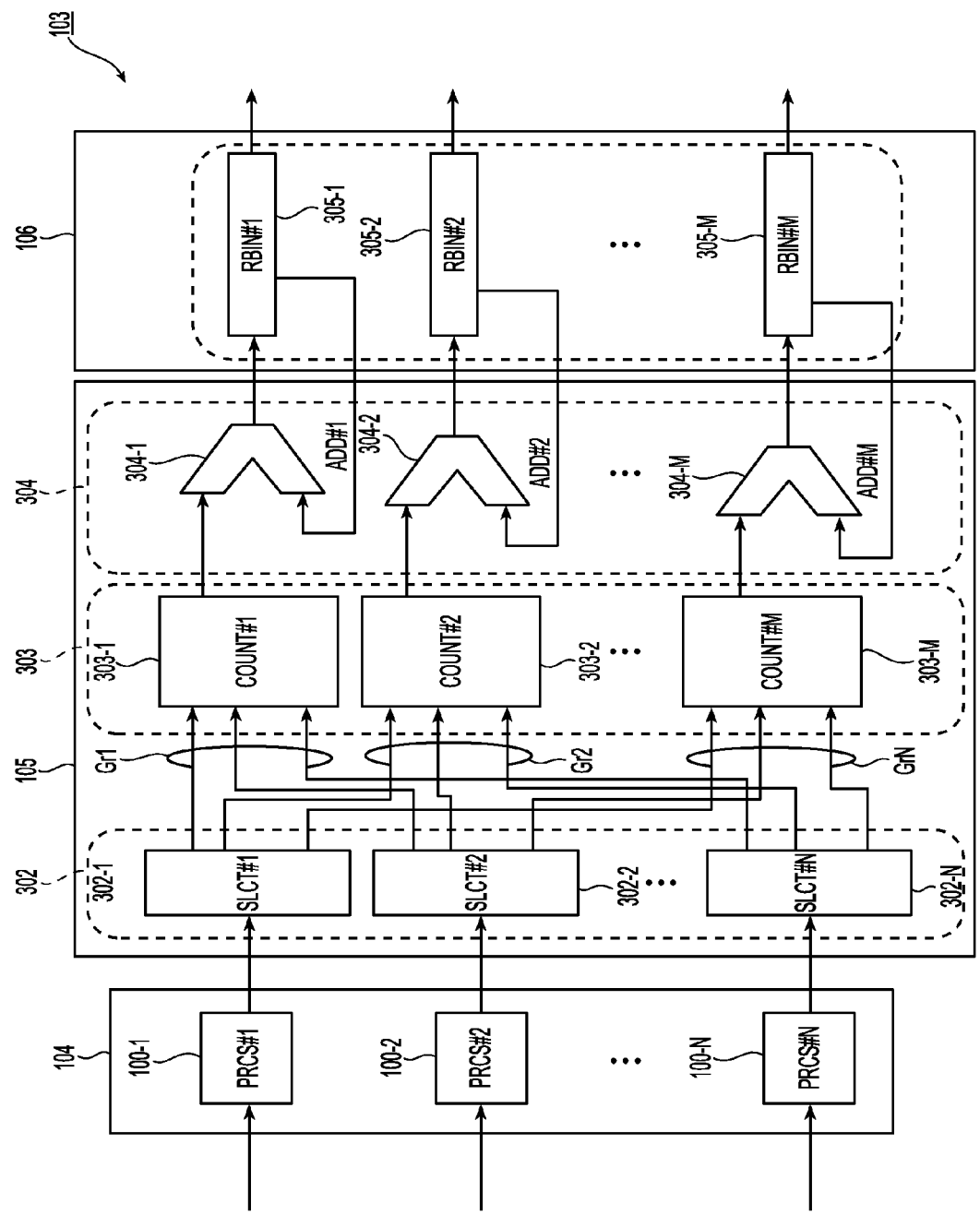
FIG. 3 is a block diagram illustrating a specific example of an image processing module in an embodiment 1.

A specific example of the image processing module 103 is shown in FIG. 3. The histogram processing circuit 105, has a group of selectors 302, a group of counters 303, and a group of adders 304 in series. The group of selectors 302 includes N selectors (SLCT#1 to SLCT#N) 302-1 to 302-N. The output of each of the N processors is provided to a corresponding one of the N selectors. The selectors 302-1 to 302-N, provided to the processors 100-1 to 100-N in this one-to-one manner, receive as input the operation result from the processors 100-1 to 100-N which perform operation in parallel at each operation cycle.

Here, the predetermined operation includes a process of simply outputting pixel values received by the processors, a process of quantizing the received pixel values, or an operation of receiving and blending several pieces of pixel data, and it does not matter in the invention what the target of operation is. In the present embodiment, for example, the operation result includes data indicating the gradation of the pixel explicitly or implicitly.

The selectors 302-1 to 302-N are configured to recognize a corresponding gradation from the received operation result, and generate a classification signal indicating the type of the recognized gradation. In particular, each selector 302-n receives a gradation from its corresponding processor 101-i and outputs a classification signal reflective of which gradation was received. The classification signal output by a selector 302-n may be in the form of a number M (M is positive integer) binary gradation number signals. For example, when the total number of possible gradations is M=256, each selector 302-n outputs 256 gradation number signals Gr1 to Gr256, one gradation number signal to each counter 303-1 to 303-M. If the selector 302-n recognizes the $i^{th}$ gradation of the M=256 possible gradations, it sets its $i^{th}$ gradation number signal to a logical value 1 and sets the remaining 255 gradation number signals to a logical value 0. In this manner, the M=256 binary gradation number signals generated by a given selector 302-n collectively represent one of M=256 possible classification signals, each classification signal serving to classify the gradation (or other output) from the corresponding processor.

The group of counters 303 have M counters (COUNT#1 to COUNT#M) 302-1 to 302-M, each counter having N inputs. Each of the counters 302-1 to 302-M receives, as input, a particular one of the M=256 gradation number signals Gr1 to Gr256 from each of the N selectors 302-1 to 302-N, and then counts how many gradation number signals of logical value 1 have been input thereto. The counting operation is performed at each parallel operation cycle of the processors 100-1 to 100-N, with the counted value being initialized at each operation cycle. Therefore, the M counters 302-1 to 302-M can hold, for instance, the number of pixels for each of M gradation of the pixels included in a single display line, for each parallel operation cycle of the processors 100-1 to 100-N.

The group of adders 304 have M adders (ADD#1 to ADD#M) 304-1 to 304-M. The histogram memory 106 includes, for example, M registers (RBIN#1 to RBIN#M) 305-1 to 305-M which can be accessed in parallel. The adders 304-1 to 304-M perform, at each of the operation cycles, a process of adding the outputs of the corresponding counters 302-1 to 302-M and the value held in the corresponding registers 305-1 to 305-M and writing the result back into the corresponding registers 305-1 to 305-M as an updated value. In other words, the adders 304-1 to 304-M and the registers 305-1 to 305-M form a histogram counter circuit which accumulates and stores the output of each of the M counters 303-1 to 303-M. In this sense, each of the M registers 305-1 to 305-M is configured to store a running total of the number of instances of a particular gradation type output by the N processors acting in parallel.

A histogram processing operation in the image processing module 103 will be described.

The group of processors 104 receives the image data, and performs the predetermined process described above to determine gradation numbers. Outputting a gradation number essentially is equivalent to determining a bin number indicating which of the bins (RBIN#1 to RBIN#M) is to be updated. For example, it is assumed for simplicity that the output gradation number in this case takes a value ranging from 1 to M. FIG. 2 illustrates a case of M=16.

The selectors 302-1 to 302-N each receive the number of the bin determined by the corresponding processor and control what value is output to which of the counters 303-1 to 303-M. Specifically, logical value 1 is output to the counter corresponding to the bin number and logical value 0 is output to the other counters. For example, if the output of the processor 100-1 is 2, the selector 302-1 outputs logical value 1 to the counter 303-2 which, in turn, is linked to the register (RBIN#2) 305-2 with bin number=2. Logical value 0 is output to the other counters. The other selectors 302-2 to 302-N output logical value 1 or 0 to the group of counters 303 depending on the output of the corresponding processors 101-2 to 101-N.

Each counter 303-1 to 303-M in the group of counters 303 has a role of decoder which respectively receives N sets of 1-bit inputs, and counts and outputs the number of logical value 1s. Outputs of the counters 303-1 to 305-M are respectively reflected in the corresponding registers 305-1 to 305-M of the histogram memory 106. Specifically, for example, the adder 304-1 corresponding to the counter 303-1 reads a value held in the register 305-1 for a corresponding bin number of the histogram memory 106, adds to the value a value output from the counter 303-1, and writes it back into the register 305-1 as an updated value. Outputs of other counters 303-2 to 303-M are processed similarly.

As the configuration of the counters 303-1 to 303-M, a configuration of an adder which simply receives N sets of 1-bit input values and adds all the values, or a configuration shown in FIG. 4 described below may be employed.

Figure 4:
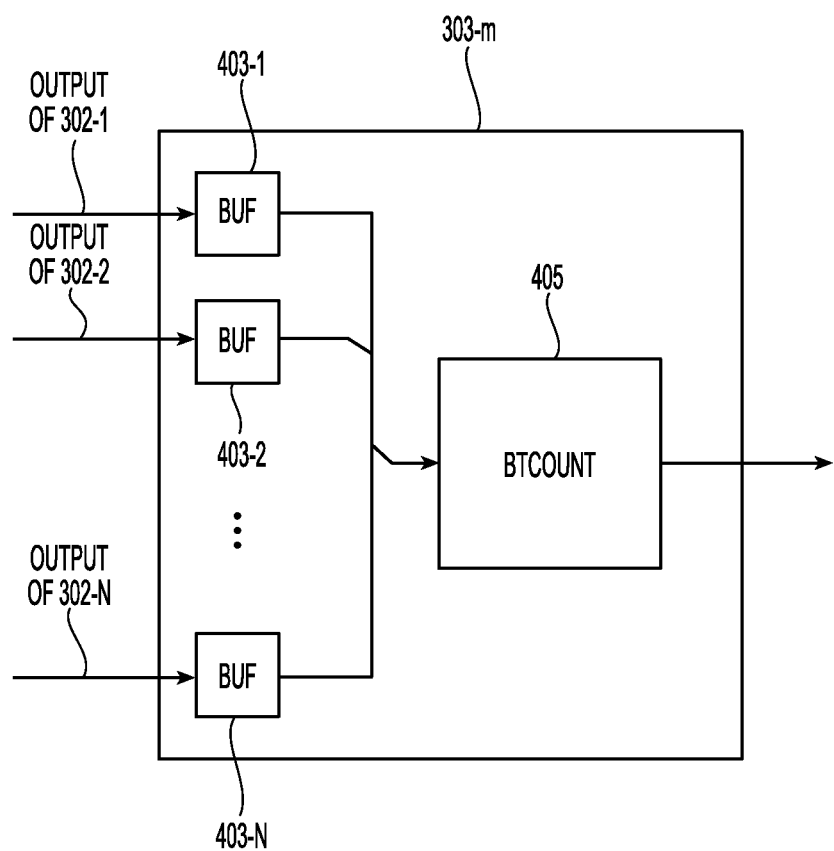
FIG. 4 is a block diagram illustrating a configuration of a counter in FIG. 3.

FIG. 4 illustrates the configuration of a counter.

The counter 303-m (m=1 to M) has counter buffers 403-1 to 403-N and a bit counter (BTCOUNT) 404. There are a total of N counter buffers (BUF) 403-1 to 403-N, having a size of 1 bit respectively. Each bit corresponds to one of the N processors 100-1 to 100-N and thus to a corresponding one of the N selectors 302-1 to 302-N. N sets of 1-bit signals 402-1 to 402-N output from the selectors 302-1 to 302-N are received by the counter buffers 403-1 to 403-N. N flip-flops, for example, can be considered as a method of realizing the counter buffers 403-1 to 403-N. The bit counter 404 counts the number of bits of "1" stored in the counter buffers 403-1 to 403-N. As a method of realizing the bit counter 404, the configuration of an adder which receives input values of N sets of 1-bits and adds all the values, or a decoder which receives input values of N sets of 1-bits and returns the number of bits being set to 1 can be considered.

Next, an operation timing of the histogram processing by the image processing module 103 will be described, referring to FIGS. 5 and 6.

Figure 5:
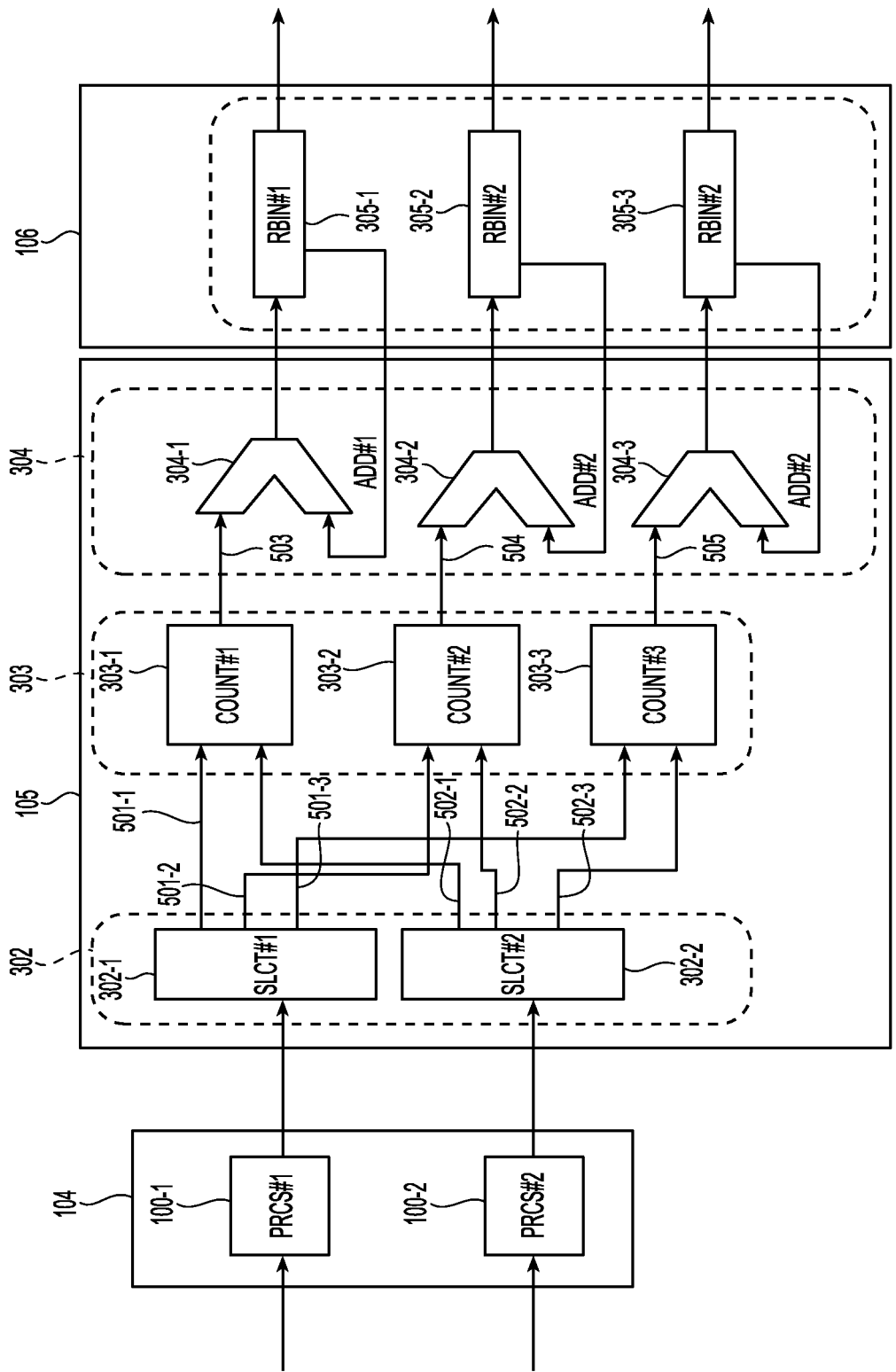
FIG. 5 is a block diagram illustrating, in a simplified form for ease of understanding, a configuration with N=2 and M=3 in FIG. 3.

FIG. 5 illustrates, for ease of understanding, a configuration with N=2 and M=3 in FIG. 3. FIG. 6 illustrates the operation timing of the histogram processing based on the configuration shown in FIG. 5.

Reference numeral 601 indicates a clock which operates the image processing device. For example, a cycle of the clock 601 is regarded as the operation cycle.

Figure 6:
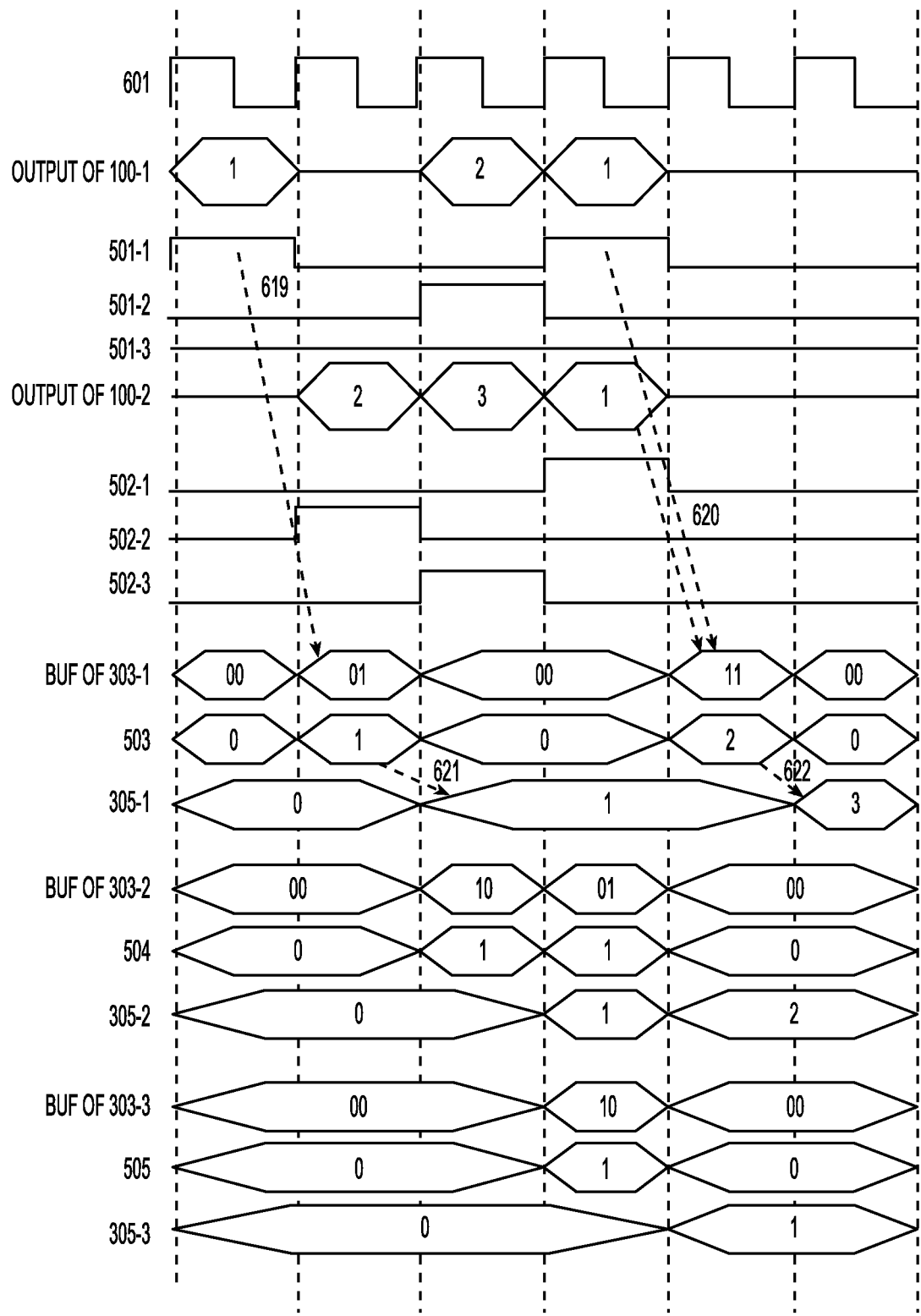
FIG. 6 is a timing chart illustrating an operation timing of histogram processing based on the configuration in FIG. 5.

As indicated in FIG. 6 by the data output of processor 101-1, the processor 101-1 outputs one at the first clock, two at the third clock, and one at the fourth clock. The selector 302-1 determines, according to the output value of the processor 101-1, which of the signal lines 501-1, 501-2, and 501-3 will have logical value 1 output thereto.

As indicated by the data output of the processor 100-2, the processor 100-2 outputs one at the second clock, three at the third clock, and one at the fourth clock. The selector 302-2 determines, according to the output value of the processor 100-2, which of the signal lines 502-1, 502-2, and 502-3 will have logical value 1 output thereto.

Since, in this example, N=2, the counter 303-1 receives 2 inputs and so the state of the counter buffer (BUF) of the counter 303-1 is illustrated by a 2-bit expression. The lower bit (i.e., the "first" bit or, equivalently, the bit on the right) of the 2 bits indicates a signal from the selector 302-1, and the higher bit (i.e., the "second" bit or, equivalently, the bit on the left) indicates a signal from the selector 302-2. At the beginning of each operation cycle, the counter buffer (BUF) is initialized to 00, and a bit corresponding to a signal received from a predetermined selector (processor) is set to one if the signal is one (referred to as an accumulation request in the following discussion), or set to zero if there is no accumulation request. When the counter buffer (BUF) is implemented by a configuration having N flip-flops, an exemplary implementation can be considered such as inputting zero if there is an accumulation request to the set terminal of the flip-flop and inputting one if there is no accumulation request.

In the example illustrated in FIG. 6, an accumulation request at the first clock of the processor 100-1 is received (501-1 is 1) at the second clock (619) and so one is set to the first bit in the buffer 303-1. Since there is no accumulation request from the processor 100-2 (502-1 is 0) in the first clock, the second bit in the buffer 303-1 is set to zero at the second clock. Thus, the value of the buffer 303-1 is set to '01' at the second clock.

Since, at the second and third clocks, there is no accumulation request from both of the processors 100-1 and 100-2 (501-1 and 502-1 are both zero in the second and third clocks), both bits in the buffer 303-1 are set to zero in the third and fourth clocks. Thus, the value of the buffer 303-1 is set to '00' at the third and fourth clocks.

Since, at the fourth clock, an accumulation request is received from both of the processors 100-1 and 100-2 (501-1 and 502-1 are both 1), the value of the buffer 303-1 is set to '11' at the fifth clock (620).

Reference numeral 503 indicates an output from the bit counter (BTCOUNT) of the counter 303-1, which counts the number of bits of the counter buffer (BUF) and outputs it to the corresponding adder 304-1. In the example illustrated in FIG. 6, at the second clock, the content '01' of the counter buffer (BUF) is received and one (total number of 'one' bits) is output (621). At the third and fourth clocks, the content '00' of the counter buffer is received and 0 (the total number of 'one' bits) is output. And at the fifth clock, the content '11' of the counter buffer (BUF) is received and two (the total number of 'one' bits) is output (622).

In the example illustrated in FIG. 6, the state of the register 305-1 of the histogram memory 106 is initialized to a value of zero. The value 1 output by the bit counter (BTCOUNT) at the second clock is received at the third clock and is added by the adder 304-1 to the initial value of zero held in register 305-1. The adder 304-1 outputs the value 1 and the register 305-1 is updated to reflect the updated value of 1. The value of 0 output by the bit counter (BTCOUNT) at the third and fourth clocks results in the value 1 being maintained by the register 305-1 during the fourth and fifth clocks, since nothing is added. The value 2 output by the bit counter (BTCOUNT) at the fifth clock is received at the sixth clock and is added by the adder 304-1 to the value of 1 now held in register 305-1. The adder 304-1 outputs the value 3 and the register is updated to reflect the updated value of 3.

Similarly, the value of the counter buffer (BUF) of the counter 303-2, the output 504 of the bit counter (BTCOUNT) of the counter 303-2, and the value of the register 305-2 are illustrated. Likewise, the value of the counter buffer (BUF) of the counter 303-3, the output 505 of the bit counter (BTCOUNT) of the counter 303-3, and the value of the register 305-3 are illustrated.

A process of acquiring a histogram at such timing is performed in a pipelined manner, and the histogram values are acquired sequentially. On this occasion, the histogram can be updated at a regular cycle which is always in synchronization with the operation cycle, regardless of the type of data to be input, i.e., the state of gradation distribution of pixels in the image data. In addition, when updating the histogram at each clock, data to be input need not be output from the processor at each clock and may be singly output as shown in FIG. 6.

<<Embodiment 2>>

In the embodiment 1, each bin of the histogram memory 106 is formed by a register based on flip-flops as shown in FIG. 3. When each bin of the histogram memory is formed by a register based on a group of flip-flops, it is possible to update each bin in parallel at each operation cycle, i.e., accumulate histogram values in each bin at each operation cycle. On the other hand, when the histogram memory 106 is formed by random-access memory (RAM), updating cannot be performed at each cycle but the number of cycles that can be updated is determined according to the number of access ports of the RAM and the number of RAMs. The configuration of the case where a RAM is used for the histogram memory will be described as an embodiment 2.

Figure 7:
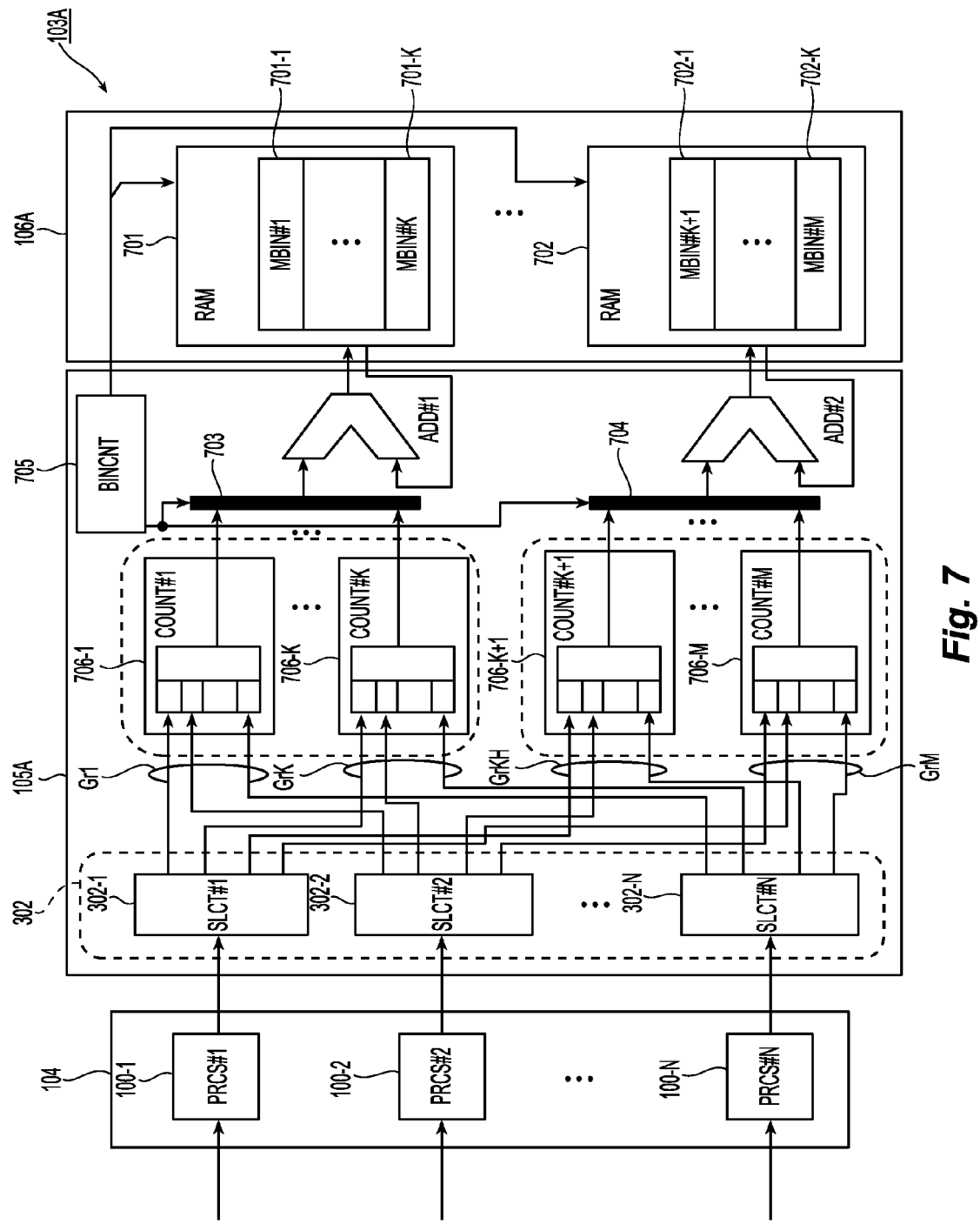
FIG. 7 is a block diagram illustrating a specific example of an image processing module according to an embodiment 2 when using a RAM as a histogram memory.

FIG. 7 illustrates a specific example of the image processing module 103A as the embodiment 2 of the parallel operation device when using a RAM as the histogram memory. Although not particularly illustrated, the image processing module 103A according to the embodiment 2 can also be applied to a microcomputer including a single chip as with FIG. 1.

In the image processing module 103A shown in FIG. 7, the histogram memory 106A is formed using J=two RAMs 701 and 702 each having an access port. Here, a memory area is assigned so that each one of the J=2 RAMs 701 and 702 handles K=M/2 bins. In other words, the RAM 701 has K memory areas (MBIN#1 to MBIN#K) 701-1 to 701-K assigned thereto, and the RAM 702 has K memory areas (MBIN#K+1 to MBIN#M) 702-1 to 702-K assigned thereto.

Since only one memory area in each of RAM 701 and 702 (also referred to as memory bin) can be accessed at a time, all the memory bins can be updated only after repeating access K times while changing the memory bins to be accessed each time. In the embodiment 2, therefore, the histogram processing circuit requires a configuration which generates and holds a count value that is accumulated in a memory bin which is sequentially accessed once every K access cycles in accordance with a period of K access cycles. This will be described in detail below.

In the configuration shown in FIG. 7, memory bins to be accessed are changed for each memory cycle. As the method of changing memory bins, a method of simply taking turns can be considered. In other words, it suffices to take turns such that an accumulation value corresponding to the bin number 1 (output value of the counter 706-1) is reflected in the memory bin 701-1 of the RAM 701 and an accumulation value corresponding to the bin number K+1 (output value of the counter 706-K+1) is reflected in the bin 702-1 of the RAM 702 at the first cycle, and an accumulation value corresponding to the bin number 2 (output value of the counter 706-2) is reflected in the bin 701-2 of the RAM 701 and an accumulation value corresponding to the bin number K+2 (output value of the counter 706-K+2) is reflected in the bin 702-2 of the RAM 702 at the second cycle, respectively.

The bin selectors 703 and 704, and a bin selector control unit 705 are used for these processes. The bin selector control unit 705 controls, with regard to the bin selectors 703 and 704 and the RAMs 701 and 702, which of the output values of the counters is output to which bin.

Figure 8:
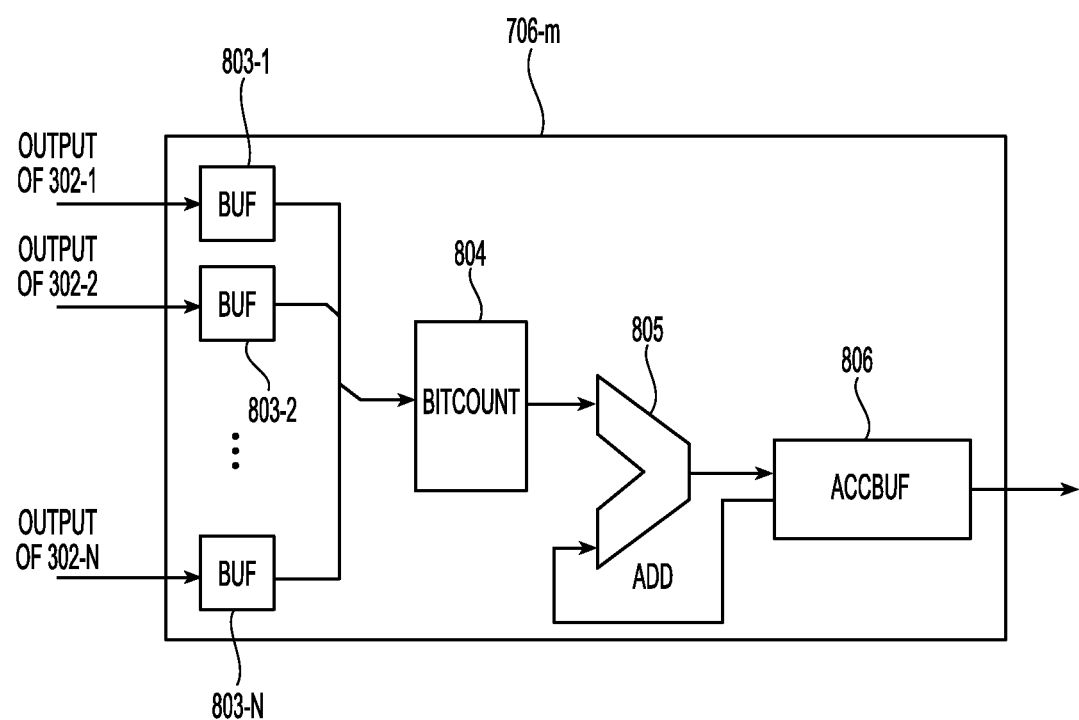
FIG. 8 is a block diagram illustrating a configuration of a counter which accumulates, at each cycle, inputs for K cycles in FIG. 7.
Figure 9:
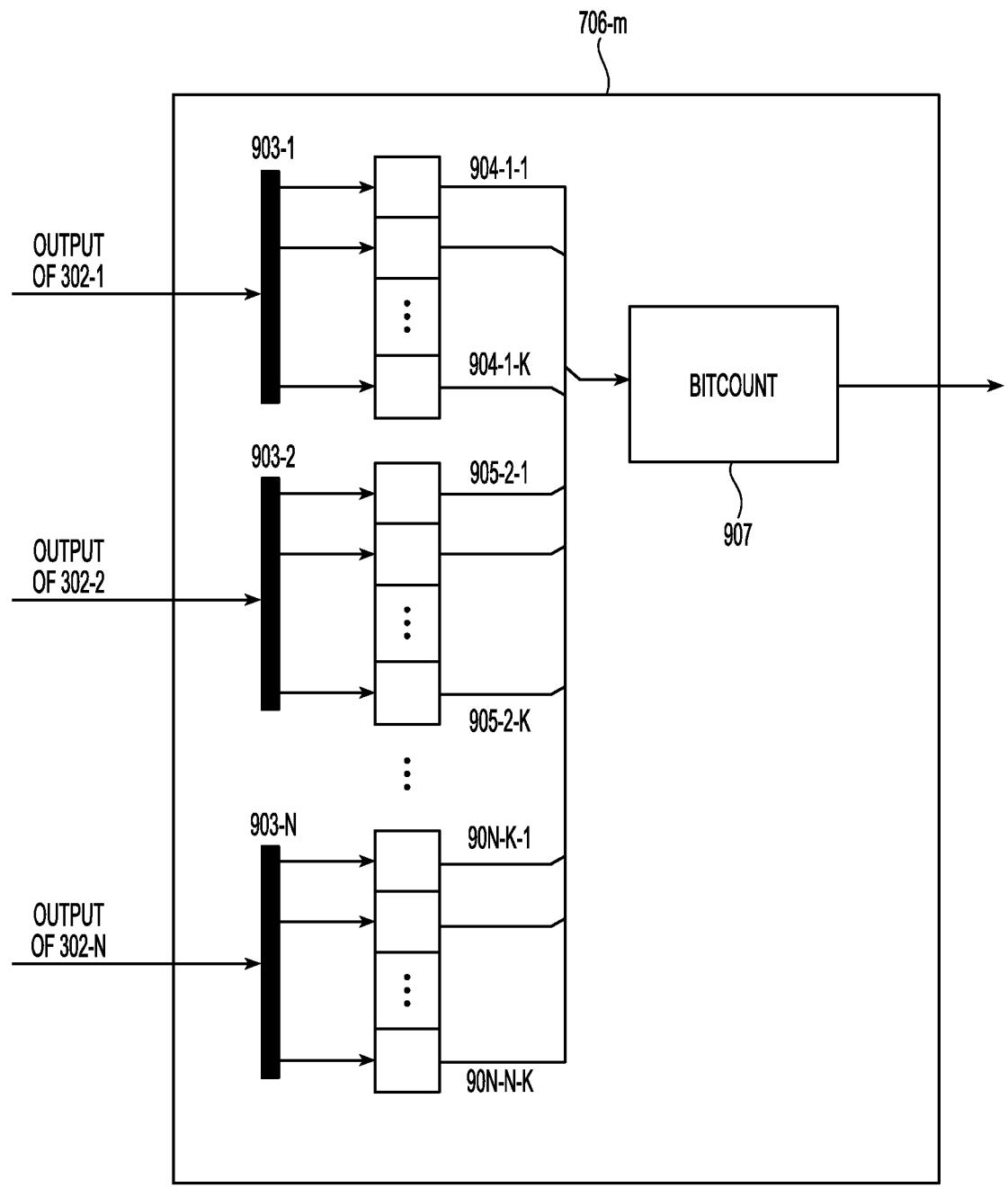
FIG. 9 is a block diagram illustrating a configuration of a counter provided with K times the counter buffers in FIG. 7.

The fact that each memory bin cannot be updated at each cycle requires a function of holding the accumulated value for a time period during which writing into the counter is prohibited. Several methods of implementing such counters 706-1 to 706-M can be considered as illustrated in FIGS. 8 and 9. Implementation of the counter is not limited to those in FIGS. 8 and 9, and any configuration will do as long as it can hold up to N×K values.

FIG. 8 illustrates a configuration of the counter which accumulates, at each cycle, inputs across K operation cycles. The counter 706-m shown in the drawing has, in addition to N buffers (BUF) 803-1 to 803-N which receive the output of the selectors 302-1 to 302-N at each cycle and a bit counter (BTCOUNT) 804 which counts the values of respective buffers 803-1 to 803-N at each cycle, an adder (ADD) 805, and an accumulation buffer (ACCBUF) 806. For each of K cycles, the adder 805 of counter 706-m adds the value in the accumulation buffer 806 to the value of the bit counter 804 and writes the result back into the accumulation buffer 806 as an updated value. In this manner, the accumulation buffer 806 can store accumulation values over K cycles. Since it needs to store accumulation values over only K cycles, i.e., only up to N×K values need be stored, the necessary size of the accumulation buffer 806 is log2(N×K) bits at most.

FIG. 9 illustrates a configuration of the counter 706-m provided with K times the counter buffers in FIG. 8. Although a 1-bit counter buffer is provided to a single processor in FIG. 4, K-bit counter buffers 904-1-1 to 904-1-K, . . . , 904-N to 1-904-N-K are provided corresponding to a single processor in FIG. 9. For example, K-bit counter buffers 904-1-1 to 904-1-K are provided for a 1-bit output Gr1 of the selector 302-1. Bit selectors 903-1 to 903-N corresponding to each of the processors 100-1 to 100-N select which bit of the K-bit counter buffers will have supplied thereto a signal from the processor. For example, the bit selector 903-1 selects the K-bit counter buffers 904-1-1 to 904-1-K in turn in synchronization with the operation cycle. The bit counter 907 counts the number of bits set to 1 in counter buffers having a total of N×K bits.

Next, an operation timing of the histogram processing according to the embodiment 2 will be described, referring to FIGS. 10 and 11.

Figure 10:
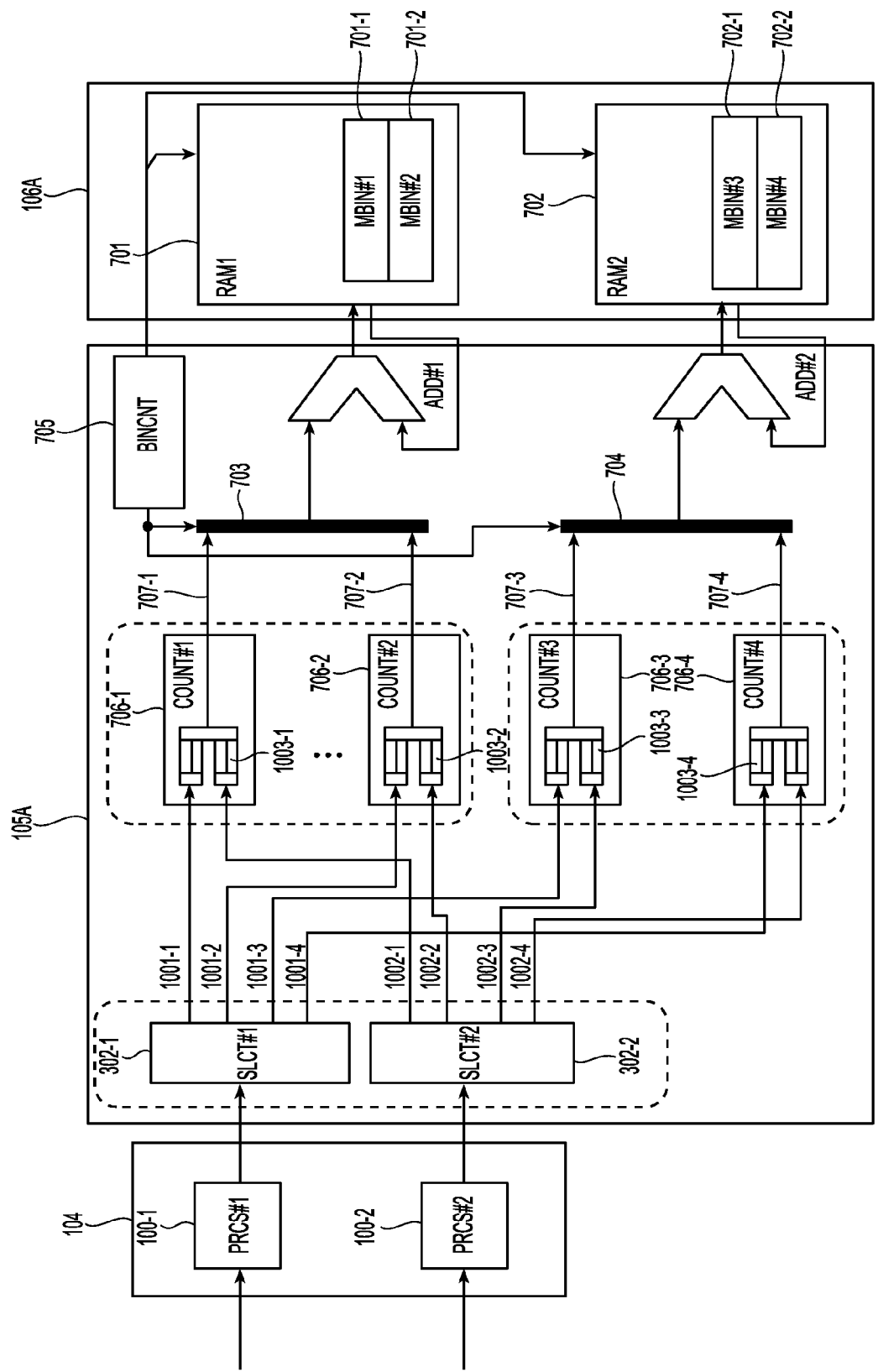
FIG. 10 is a block diagram illustrating, in a simplified form for ease of understanding, a configuration with N=2, M=4, and K=2 in FIG. 7.

FIG. 10 illustrates, for ease of understanding, a configuration with N=2, M=4, and K=2 in FIG. 7, with the number of groups of counters J=M/K=2. FIG. 11 illustrates an operation timing of the histogram processing based on the configuration shown in FIG. 10. In this case, it is assumed that the configuration shown in FIG. 9 is employed as the configuration of the counter. The processors each have connected thereto 2-bit counter buffers in the counter, and thus the counter has a total of 4 bits of counter buffers.

Figure 11:
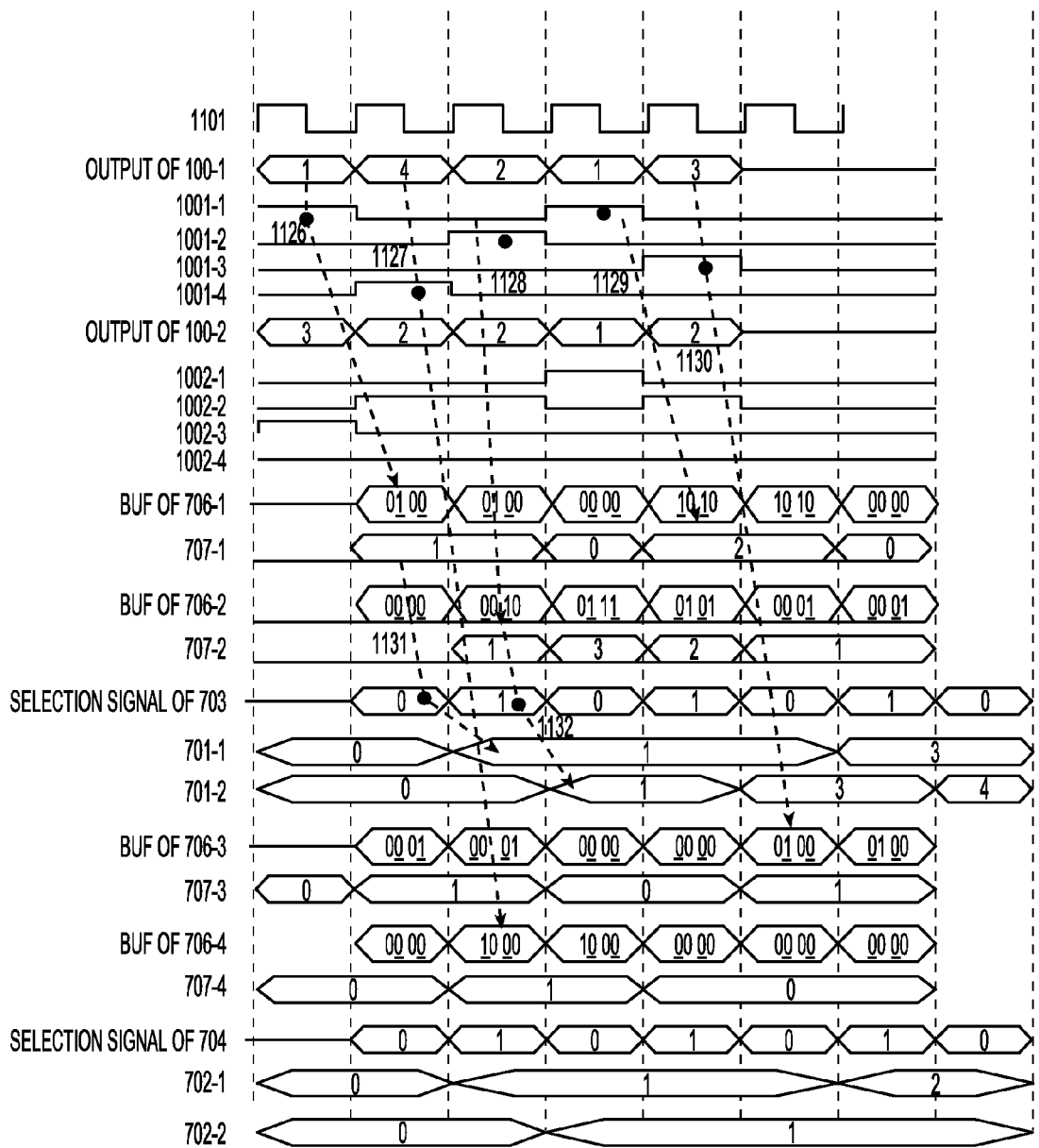
FIG. 11 is a timing chart illustrating an operation timing of the histogram processing based on the configuration shown in FIG. 10.

In FIG. 11, reference numeral 1101 is an operation clock indicating an operation cycle. As illustrated, the output of the processor 100-1 is in the order of 1, 4, 2, 1, 3 sequentially for each operation cycle. Accordingly, outputs 1001-1 to 1001-4 of the selector 302-1 are formed. Logical value 1 (high-level output) of the selector outputs 1001-1 to 1001-4 is regarded as an accumulation request to the counters 706-1 to 706-2. As illustrated, outputs of the processor 302-2 are 3, 2, 2, 1, 2 for each operation cycle. Accordingly, outputs 1002-1 to 1002-4 of the selector 302-2 are formed. Logical value 1 (high-level output) of the selector outputs 1002-1 to 1002-4 is regarded as an accumulation request to the counters 706-3 to 706-4.

The counter buffer in the counter 706-1 includes 4 bits. Notation of the content of the counter buffer is assumed to be X0X1Y0Y1. X0, X1, Y0, and Y1 respectively take a 1-bit state which is set to either logical value 0 or logical value 1. X0 and X1 have reflected thereto an accumulation request 1001-1 from the processor 100-1, alternately in synchronization with the clock cycle. Y0 and Y1 similarly have reflected thereto an accumulation request 1002-1 from the processor 100-2 alternately according to the clock cycle. The bit to be reflected in each clock cycle is underlined in the illustration of FIG. 11.

Reference numeral 707-1 indicates the output of the counter 706-1, which is the output of the corresponding bit counter 907 which received, as input information, the contents of the counter buffer. The content of the 4 bits of the counter buffer (BUF) 1003-2 of the counter 706-2 and the output 707-2 thereof are as illustrated. Similarly the content of the 4 bits of the counter buffer (BUF) 1003-3 of the counter 706-3 and the output 707-3 thereof are as illustrated, and the content of the 4 bits of counter buffer (BUF) 1003-4 of the counter 706-4 and the output 707-4 thereof are as illustrated.

With regard to the selection for the bin selectors 703 and 704, the selection status varies in synchronization as illustrated, and a selection signal alternatingly taking values of 0 and 1 in synchronization with the clock cycle controls which of the memory bins the output of the counter will be output to. Focusing on the bin selector 703, for example, if the selection control signal is 0, the bin selector 703 reflects the result of the counter 706-1 to the memory bin 701-1 of the RAM 701; and if the selection control signal is 1, the bin selector 703 reflects the result of the counter 706-2 to the bin 701-2 of the RAM 701. Similarly, focusing on the bin selector 704, if the selection signal is 0, the bin selector 704 reflects the result of the counter 706-3 to the memory bin 702-1 of the RAM 702; and if the selection signal is 1, the bin selector 704 reflects the result of the counter 706-4 to the memory bin 702-2 of the RAM 702. The content of the memory bins 701-1, 701-2, 702-1, and 702-2 on this occasion is as illustrated.

Here, an operation focusing on the output of the processor 100-1 will be further described. Logical value 1 is output from the processor 100-1 at the first clock. In the selector 302-1, an accumulation request is issued to the counter 706-1. The accumulation request is indicated by reference numeral 1001-1. The accumulation request enters the counter 706-1 to update the value of the counter buffer 1003-1. The situation is illustrated as "BUF of 706-1" shown in FIG. 11, in which the bit of X1 is updated to 1, according to the notation X0X1Y0Y1 as described above. This series of operations is shown by the dashed arrow 1126. The black dots in between indicate the corresponding accumulation request. In the same manner, 4 is output from the processor 100-1 at the second clock, an accumulation request is issued in the selector 302-1 to the counter 706-4, and the counter buffer 1003-4 is updated (operation shown by the dashed arrow 1127). Similarly, the dashed arrows 1128, 1129, and 1130 indicate the operation in which the outputs of processor 100-1 at the third, the fourth, and the fifth clocks are reflected in respective counter buffers.

Next, let us focus on the counter 706-1. The situation of the 4-bit counter buffer 1003-1 of the counter 706-1 is as shown by "BUF of 706-1" in FIG. 11, and the output of a counter is the number of bits set to 1 in the counter buffer. The result is indicated by the signal 707-1. The counter buffer 1003-2 of the counter 706-2 and an output thereof are similarly operated. Finally, focusing on reflection in the RAM 701, the values of the memory bin 701-1 and the memory bin 701-2 are alternatingly changed according to the control (selection signal of 703) of the bin selector 703. If the selection signal value of the bin selector 703 is 0, the output of the counter 706-1 is used to update the memory bin 701-1 and, if the value is 1, the output of the counter 706-2 is used to update the memory bin 701-2.

The invention made by the inventors has thus been specifically described based on embodiments, however it is needless to say that the invention is not limited thereto and may be changed in various ways in a range not deviating from its concept.

For example, any type of data, such as image data or audio data, may be handled by the parallel operation device according to the invention. In addition, when handling image data, the predetermined operation performed by a plurality of processors in parallel is not limited to an operation on pixels of one or more display lines and any appropriate operation will do as long as the operation acquires histogram values for generating a histogram.

Each bin in the histogram memory is not limited to a flip-flop configuration having a sufficient number of bits for expressing frequencies, or the case where a single-port RAM is used. For example, a multi-port RAM may be used.

Although the group of selectors 302 and the group of processors 104 have been shown as separate items, the selector function may be provided within the processors 100-1 to 100-N. For example, a microcode processor or the like may be used to implement the selector in a software-like manner via instructions. In this case, the data (bin number) operated by the processor may be temporarily stored in a register or a local memory provided to each processor, and subsequently the selector may be operated by writing a predetermined value directly into the counter buffer.

In addition, it is needless to say that the processors allowed to operate in parallel are not limited to a processing unit as a program processing circuit and may be a plurality of processing units whose operation procedures are respectively controlled predetermined operation sequencers.

What is claimed is:

1. A parallel operation histogramming device comprising:
a number N processors capable of parallel operation;
a number M counters which output respective operation results for each parallel operation by the N processors, the number M also being the number of histogram bins;
a histogram counter circuit which accumulates and stores, for each counter, the outputs of the M counters; and
N signal generation circuits which generate M types of classification signals for indicating which of the M types of histogram values the respective operation results belong to, wherein:
the M counters receive as input and count, for each type, classification signals output from the N signal generation circuits so as to acquire, for each parallel operation by the N processors, a number of pieces of data for each of M types of histogram values to which the respective operation results belong; and each of the M counters is configured to receive input from all N signal generation circuits.

2. The parallel operation histogramming device according to claim 1, wherein the M counters count and output, for each histogram value, a number of pieces of data for each of M types of histogram values to which the respective operation results belong.

3. The parallel operation histogramming device according to claim 1, wherein the signal generation circuit generates, for an operation result of a corresponding processor, M types of classification signals corresponding to histogram values, assigns logical value 1 to a classification signal of a histogram value corresponding to an input operation result and logical value 0 to a classification signal of a histogram value not corresponding to the input operation result, and outputs the classification signals.

4. The parallel operation histogramming device according to claim 1, wherein the histogram counter circuit has an adder circuit and a register provided to each of the M counters, the adder circuit adds an output of a corresponding counter and a value held in a corresponding register, and the register receives and stores an output of a corresponding adder circuit as an updated value.

5. The parallel operation histogramming device according to claim 1, wherein the M types of histogram values are gradients which pixels can exhibit.

6. A parallel operation histogramming device comprising:
a number N processors capable of parallel operation;
a number M counters which output respective operation results for each parallel operation by the N processors, the number M also being the number of histogram bins;
a histogram counter circuit which accumulates and stores, for each counter, the outputs of the M counters; and
N signal generation circuits which generate M types of classification signals for indicating which of the M types of histogram values the respective operation results belong to, wherein:
the M counters receive as input and count, for each type, classification signals output from the N signal generation circuits so as to acquire, for each parallel operation by the N processors, a number of pieces of data for each of M types of histogram values to which the respective operation results belong;
the M counters are organized into a number J groups each comprising a number K counters;
each counter in each group of K counters is configured to count said number of pieces of data for one of the M types of histogram values; and
said each counter is configured to output said number of pieces of data it has counted to the histogram counter circuit, once in every K parallel operations of the N processors.

7. A parallel operation histogramming device comprising:
a number N processors capable of parallel operation; and
a number M counters which count, for each parallel operation by the N processors, respective frequencies of data classified into M types based on respective operation results, and accumulate the counted values once in every K times of the parallel operation, with accumulation timings shifted to each other, M also being the number of histogram bins and K being an integer,
wherein the M counters count a number of pieces of data for each of M types of histogram values to which the respective operation results belong, and accumulate the counted values once in every K times of the parallel operation, and the parallel operation histogramming device further comprises a number J memory units each provided with K memory areas which accumulate and store output of the counter which has been selected one by one sequentially from each of J groups into which the M counters are divided into units of K.

8. A parallel operation histogramming device comprising:
a number N processors capable of parallel operation;
a number M counters which count, for each parallel operation by the N processors, respective frequencies of data classified into M types based on respective operation results, and accumulate the counted values once in every K times of the parallel operation, with accumulation timings shifted to each other, M also being the number of histogram bins and K being an integer; and
N signal generation circuits which generate M types of classification signals for indicating which of the M types of histogram values the respective operation results belong to,
wherein the M counters receive as input and count, for each type, classification signals output from the N signal generation circuits, and accumulate the counted values once in every K times of the parallel operation, and
the parallel operation device further comprises:
a counter selector which selects an output of the counter one by one sequentially from each of a number J groups into which the M counters are divided into units of K, and
J memory units respectively provided with K memory areas which accumulate and store output of the counter selected by the counter selector for each counter, and the memory area being selected in synchronization with selecting an output of the counter.

9. The parallel operation histogramming device according to claim 8, wherein:
the signal generation circuit generates, for an operation result of a corresponding processor, M types of classification signals corresponding to histogram values, assigns logical value 1 to a classification signal of a histogram value corresponding to an input operation result and logical value 0 to a classification signal of a histogram value not corresponding to the input operation result, and outputs the classification signals.

10. The parallel operation histogramming device according to claim 9, wherein:
the counter has a bit counter which receive as inputs and counts one type of corresponding classification signal from N signal generation circuits, an adder circuit, and an accumulation buffer, and
the counter adds the output of the bit counter and a value held in the accumulation buffer once in every K times of the parallel operation using the adder circuit, and accumulates the result of addition in the accumulation buffer as an updated value.

11. The parallel operation histogramming device according to claim 9, wherein the counter has:
an input buffer which receives as inputs and holds one type of corresponding classification signal from N signal generation circuits once in every K times of the parallel operation, and
a bit counter which counts and outputs, once in every K times of the parallel operation, the classification signals held by the input buffer.

12. The parallel operation histogramming device according to claim 8, wherein the M types of histogram values are gradients which pixels can exhibit.

13. A microcomputer comprising a parallel operation device in accordance with claim 1 and a central processing unit which controls the parallel operation device.

14. The microcomputer according to claim 13, wherein the parallel operation histogramming device and the central processing unit are formed on a common semiconductor substrate.

15. The microcomputer according to claim 13, further comprising:
- an internal bus;
- a memory controller; and
- a video interface circuit; wherein:
- the parallel operation histogramming device, the central processing unit, the memory controller, and the video interface circuit, are connected to one another via the internal bus.

16. The microcomputer according to claim 15, wherein the parallel operation histogramming device, the central processing unit, the memory controller, and the video interface circuit are formed on a common semiconductor substrate.

17. The microcomputer according to claim 15, wherein:
- the histogram counter circuit comprises a histogram memory for storing said number of pieces of data for each of M types of histogram values; and
- the N processors and the histogram memory have separate connections to the internal bus.

18. A video processing system comprising:
- the microcomputer according to claim 15,
- one or more external memories connected to the memory controller and configured to store images to be processed by the N processors and receive histogram data accumulated in a histogram memory of the histogram counter circuit; and
- a video camera connected to the video interface circuit and configured to capture images for storing in said one or more external memories.

* * * * *